Dec. 2, 1930.  S. E. RAWLS  1,783,672
MOWING MACHINE
Filed Feb. 29, 1928
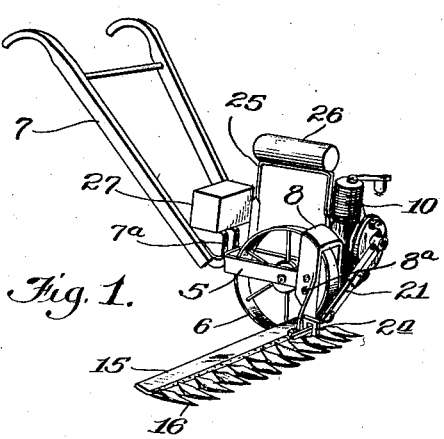
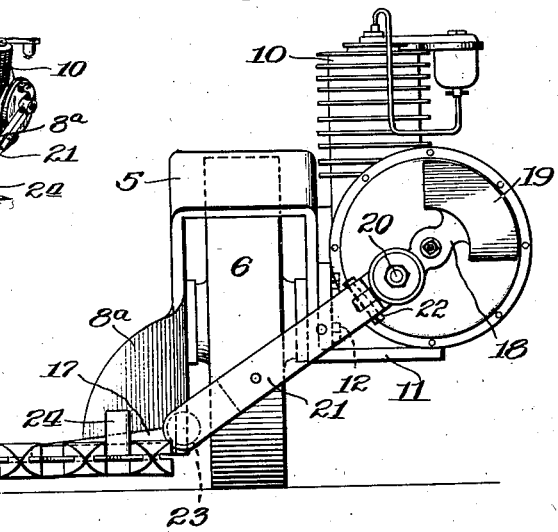
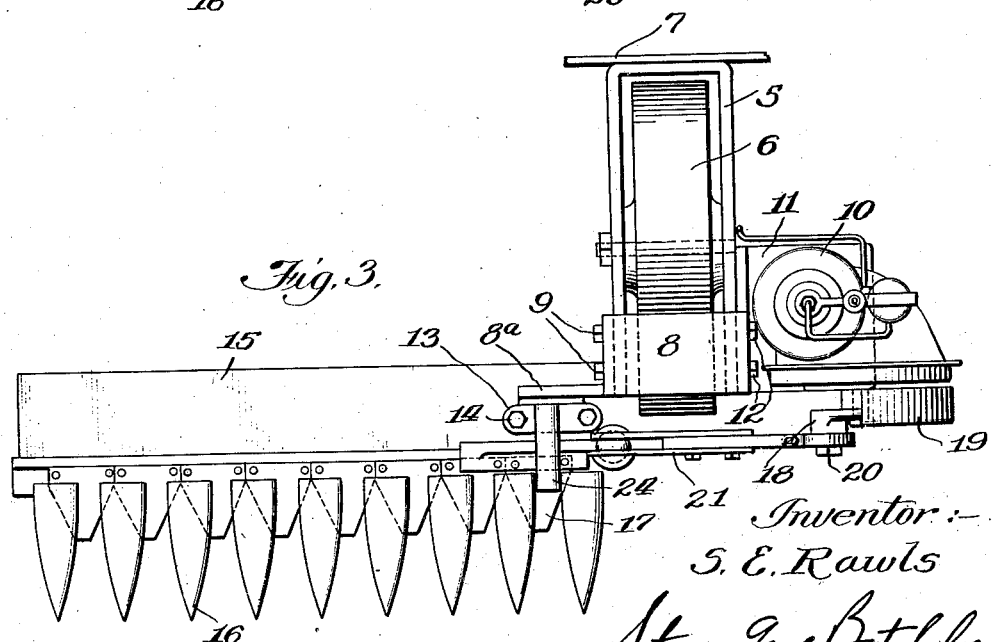
Inventor:—
S. E. Rawls
By Stevens and Batchelor
Attys.

Patented Dec. 2, 1930

1,783,672

UNITED STATES PATENT OFFICE

SILAS E. RAWLS, OF STREATOR, ILLINOIS, ASSIGNOR TO RAWLS MANUFACTURING COMPANY, A CORPORATION OF ILLINOIS

MOWING MACHINE

Application filed February 29, 1928. Serial No. 257,951.

My invention relates to machines for mowing grass and weeds, and more particularly to that type of machines which are power operated, and it is my main object to provide a machine of this kind which is hand-propelled and may be moved about with ease.

A further object of the invention is to design the novel machine on the lines of a wheelbarrow, with the advantages of easy propulsion, good balance, and ready adaptation to the surfaces upon which the machine is moved.

A still further object of the invention is to incorporate a novel support for the power apparatus, which disposes the same rigidly and its elements in harmony.

A final, but nevertheless important object of the invention is to design the novel structure on lines of exceeding simplicity, that the same may be manufactured at low cost.

With the above objects in view and any others that may suggest themselves from the specification and claims to follow, a better understanding of the invention may be gained by reference to the accompanying drawing, in which—

Figure 1 is a perspective view of the novel machine;

Fig. 2 is a front elevation of the power element and operating gear; and

Fig. 3 is a plan view of Figure 2.

I am aware of the existence of various power operated mowing machines, some being carried by trucks and others being built in 3-wheeled fashion, but realize that these machines are more or less clumsy and take up a considerable amount of room. Machines of this kind are usually power-propelled, or hand-propelled and power driven, but it will be realized that their very nature either demands a greater amount of power for both the propulsion and driving needs, or considerable strength on the part of the operator or operators to propel the same, due to the weight and bulk of the machines. It has therefore been my intention to devise a mowing machine of a light character, without the deficiencies noted above, and I have accomplished this in accordance with the above mentioned objects, as will become clear from the description to follow.

Referring specifically to the drawing, it will be noted that the machine generally embodies a frame 5 in the nature of a horizontal U-shaped structure in which is journaled a traction wheel 6. To the rear end of the frame is attached the assembly of the handles 7, which extend rearwardly and upwardly in the same manner as the handles of a typical wheelbarrow. The side members of the frame 5 receive toward the front of the wheel an arch frame member 8 by means of bolts 9 or other suitable securing means. The arch member 8 is of very sturdy construction, since it is designed to support both the power plant and the mower mechanism. The power plant consists of a gasoline or other type of motor 10 made as a unit and attached to one side of the frame member 8 by a suitable support 11 and bolts 12, so that it is rigidly held to the frame member. The other leg of the frame member is extended with a side offset 8a formed with bottom ears 13 which receive bolts 14 to attach a cutter bar 15 forming the base of the mower mechanism. This cutter bar is formed with guard fingers 16 and is recessed to receive a reciprocating knife 17 on the order of the conventional power sickle.

The power plant 10 has a suitable gear housing for the reduction of its speed, and receives a crank 18 externally, weighted at 19 on one side; on the other side, the crank receives pivotally, as indicated at 20, a connecting rod 21, which passes down to make a connection with the reciprocating knife 17.

It will be seen that the operation of the power plant will vibrate the connecting rod 21 so as to induce the reciprocation of the knife 17. However, in order that binding action may not occur in the rod connection, I provide a lateral swivel joint 22 at the power end of the rod 21 and a ball joint 23 at the knife end thereof. The numeral 24 denotes an arch brace extending from the structure of the ears 13 to that of the guard fingers 14 in order to support and strengthen the same relative to the base 15.

As accessories, the frame 5 carries a mounting 25 for the fuel tank 26; and the handle frame 7 carries bracket 7a for the support of a tool box 27.

It will be seen that the arch member 8 is mounted at such a point as to support the motor and mowing mechanism in counterbalanced relation as against the handle structure 7. Thus, no effort is experienced by the operator in wheeling the machine, since there is no tendency for it to be upset. At the same time, the lateral stability obtained by the hold on the handles 7 enables the operator to balance the device laterally on the traction wheel 6, so that he is able to support the mower bar in the necessary position next to the ground. The full control of the machine by the operator enables him to wheel the same over level and sloping ground without difficulty, as he need but train the machine forward or rearward to lower or raise the mower bar, and toward one or the other side to change the angle of the same to suit the slope of the ground. The control of the machine is thus fully within the hands of the operator, and he is not obliged to operate controls or other mechanical and oft unreliable means to secure the proper relation of the mower bar to the ground, as is the case in other power operated mowing machines. The device is very light and readily portable from place to place; also, it is relatively small for a power operated machine which enables it to be directed into corners and other places usually accessible with difficulty, and also stored in limited space. Owing to the extreme simplicity and evident ruggedness of the outfit, it may be produced at low cost and should stand hard usage without the need of more than ordinary attention.

I claim:—

1. A mowing machine comprising a medial traction element, a power plant on one side thereof, a mowing implement on the other side, and a handle unit to the rear of said traction element and manageable to control the machine rockably in lateral directions.

2. A mowing machine comprising a medial traction wheel, a frame, a yoke carried by the frame and straddling the traction wheel, a power plant carried by one side of the yoke at one side of said wheel, and a mowing implement carried by the other side thereof at the opposite side of said wheel.

3. A mowing machine comprising a medial traction wheel, frame bars at the sides of the latter, an arch transversely straddling the traction wheel and with its legs secured to the respective frame bars, a power plant carried by one leg of the arch, and a mowing implement carried by the other leg.

4. A mowing machine comprising a medial traction wheel, frame bars at the sides of the latter, an arch transversely straddling the traction wheel forward of the center thereof and with its legs secured to the respective frame bars, a power plant carried by one leg of the arch, and a mowing implement carried by the other leg.

5. A mowing machine comprising a substantially horizontal U-frame, a traction wheel journaled within the latter, means applied to the bend of the U-frame for the propulsion of the mowing machine, a power plant carried by one side of the U-frame, and a mowing implement carried by the other side.

6. A mowing machine comprising a substantially horizontal U-frame, a traction wheel journaled within the latter, means applied to the bend of the U-frame for the propulsion of the mowing machine, a power plant carried by one side of the U-frame, a mowing implement carried by the other side of said frame, said power plant and mowing implement being alongside the forward portion of the traction wheel, and an operative connection between the power plant and the mowing implement located forward of the wheel.

7. A mowing machine comprising a substantially horizontal U-frame, a traction wheel journaled within the latter, means carried by one side of the U-frame for the propulsion of the mowing machine, a power plant carried by the other side of said frame, said power plant and mowing implement being alongside the forward portion of the traction wheel, an operative connection between the power plant and the mowing implement located forward of the wheel, and universal joints embodied in said connection to relieve distortive strains between the power plant and the mowing implement.

8. A mowing machine comprising a frame, a traction wheel mounted in the same, a wing extended laterally from the frame, a sickle frame with a medial knife bar, and an arched extension of said wing secured to the sickle frame and straddling said knife bar.

9. A mowing machine comprising a traction element having a frame extending on each side, a power plant on one side thereof, a mowing implement on the other side connected to the power plant, and a handle unit to the rear of the traction element to rock the machine laterally.

10. A hand propelled mowing machine comprising a single traction wheel having a frame extending at the sides thereof, a mowing implement supported at one side, a power plant therefor supported at the other side and counter-balancing the implement, and a rear handle to control the machine.

11. A hand propelled mowing machine comprising a single traction wheel having a frame extending at the sides thereof, a mowing implement supported at one side, a power plant therefor supported at the other side and counter-balancing the implement laterally and in the direction of its movement, and a rear handle to control the machine laterally and in the direction of its movement.

In testimony whereof I affix my signature.

SILAS E. RAWLS.